(12) United States Patent
Fothergill

(10) Patent No.: US 10,473,090 B2
(45) Date of Patent: Nov. 12, 2019

(54) DRIVE ASSEMBLY

(71) Applicant: Alexander Fothergill, Stanford-Upon-Avon (GB)

(72) Inventor: Alexander Fothergill, Stanford-Upon-Avon (GB)

(*) Notice: Subject to any disclaimer, the term of this patent is extended or adjusted under 35 U.S.C. 154(b) by 0 days.

(21) Appl. No.: 15/736,320

(22) PCT Filed: Jun. 15, 2016

(86) PCT No.: PCT/GB2016/051780
§ 371 (c)(1),
(2) Date: Dec. 14, 2017

(87) PCT Pub. No.: WO2016/203227
PCT Pub. Date: Dec. 22, 2016

(65) Prior Publication Data
US 2018/0171988 A1 Jun. 21, 2018

(30) Foreign Application Priority Data
Jun. 15, 2015 (GB) .................................. 1510462.3

(51) Int. Cl.
*F03G 3/00* (2006.01)
*F03B 13/18* (2006.01)
(Continued)

(52) U.S. Cl.
CPC ................ *F03G 3/00* (2013.01); *F03B 13/14* (2013.01); *F03B 13/1835* (2013.01);
(Continued)

(58) Field of Classification Search
CPC ..... F03G 3/00; F03G 3/08; F03G 5/00; F03G 7/10
See application file for complete search history.

(56) References Cited

U.S. PATENT DOCUMENTS 4,538,415 A * 9/1985 Lebecque ................ F03G 3/00
285/33
7,579,705 B1 8/2009 Ross
(Continued)

FOREIGN PATENT DOCUMENTS

| GB | 2493006 A | 1/2013 |
|---|---|---|
| GB | 2013011318 A2 | 1/2013 |
| NL | 8702718 A | 6/1989 |

OTHER PUBLICATIONS

International Search Report and Written Opinion for PCT/GB2016/051780 dated Sep. 23, 2016.
(Continued)

*Primary Examiner* — Phillip A Johnson
(74) *Attorney, Agent, or Firm* — Fleit Intellectual Property Law; Paul D. Bianco; Gary S. Winer

(57) ABSTRACT

A drive assembly for providing a driving force includes: a first track declined in a first direction through a first declination; a second track, extending in a second direction and arranged to pivot with respect to the first track between a first position in which the track is substantially horizontal and a second position in which the second track is declined in the second direction through a second declination; and a shaft connected to a flywheel and. A first vehicle is arranged to travel along the first track between a first drive location and a first idle location to drive the shaft in a first direction and to cause a second vehicle to travel along the second track between a second idle location and a second drive location; and, the second vehicle is arranged to travel along the second track from the second drive location to the second idle location to cause the shaft to rotate in a second direction and to cause the first vehicle to travel from the first idle location to the first drive location. The shaft is coupled to the
(Continued)

first and second vehicles and arranged to rotate in dependence of the travel of the first and second vehicles.

21 Claims, 8 Drawing Sheets

(51) Int. Cl.
| | | |
|---|---|---|
| *F03D 15/00* | (2016.01) | |
| *F03B 13/14* | (2006.01) | |
| *F03B 17/06* | (2006.01) | |
| *F03G 5/00* | (2006.01) | |
| *F03G 7/00* | (2006.01) | |
| *H02K 7/00* | (2006.01) | |
| *H02K 7/10* | (2006.01) | |
| *H02K 7/14* | (2006.01) | |
| *F03G 3/08* | (2006.01) | |

(52) U.S. Cl.
CPC .............. *F03B 17/06* (2013.01); *F03D 15/00* (2016.05); *F03G 5/00* (2013.01); *F03G 7/00* (2013.01); *H02K 7/003* (2013.01); *H02K 7/1004* (2013.01); *H02K 7/14* (2013.01); *F03G 3/08* (2013.01); *F03G 2730/06* (2013.01); *F03G 2730/07* (2013.01); *Y02E 10/28* (2013.01); *Y02E 10/38* (2013.01)

(56) References Cited

U.S. PATENT DOCUMENTS

| | | | |
|---|---|---|---|
| 8,112,992 B2* | 2/2012 | Pirincci | H02K 53/00 |
| | | | 60/495 |
| 9,878,873 B2* | 1/2018 | Gordon | B66B 17/12 |
| 2005/0035602 A1 | 2/2005 | Gard | |
| 2008/0264145 A1 | 10/2008 | Da Silva | |
| 2011/0084488 A1 | 4/2011 | Eder | |

OTHER PUBLICATIONS

Search Report Examination Opinion for GB1510462.3 dated Dec. 3, 2015.
IPRP International Preliminary Report for PCT/GB2016/051780 dated Dec. 26, 2017.

\* cited by examiner

DRIVE ASSEMBLY

FIELD OF THE INVENTION

This invention relates to a drive assembly; in particular one that allows the renewable generation of electricity.

BACKGROUND TO THE INVENTION

Worldwide fossil fuel resources are rapidly depleting and the harmful effects of their use have been well documented. As a result, there is an ever increasing drive to provide energy, more specifically electricity, from renewable sources in an attempt to reduce further damage to the environment. Renewable sources of energy are varied in their nature, with solar power, wind power, hydroelectric power, geothermal power and wave power all commonly used methods of producing renewable energy. Such devices are well known in the art, for example as described in WO 2013/011318. However, with the majority of renewable sources, the amount of energy it is possible to generate at any one point in time is difficult to control.

It is commonly appreciated that a lack of wind, an overcast day or a lack of waves will negatively impact the ability to generate electricity via renewable sources. In such circumstances it is typical that the renewable source is providing negligible means to generate electricity; for example a hydroelectric flow may be insufficient to turn a water wheel. However, it is less commonly appreciated that wind speeds, wave action or water flow rates may be excessive for power generation. In such circumstances, the high stresses placed on an electrical generator, for example due to the excessive rotational speed of a generator shaft, may result in damage to said generator and other equipment associated with it if electricity generation is not paused.

This dependence on the correct environmental conditions for power generation can result in the sporadic availability of electricity if only a single renewable source is used for power generation. As such any strategy for electricity generation must include either a wide range of renewable sources, to ensure there is always the capacity for energy generation, means to store excess electricity for later use when renewable generation is impossible or backup generation methods in the form of fossil fuel or nuclear power stations. Whilst this is an acceptable solution for electrical supply at the largest scales, for example a national grid, such methods are wholly unsuited to circumstances where there is a desire for the means of electricity generation to be portable or the generation system is required to be remote and thus cannot be supplemented with a backup supply.

The need for a secondary, backup method of power generation or the ability to store electricity can be reduced, and perhaps eliminated, if energy, in the form of electricity, can be generated across a wider range of naturally occurring conditions. Progress in this area would be a benefit to the renewable energy sector, increasing the reliability of the electricity supply in any location without access to a large scale grid.

SUMMARY OF THE INVENTION

According to a first aspect of the present invention, there is provided a drive assembly for providing a driving force, the assembly comprising:

a first track along which a vehicle is arranged to travel, the first track being declined in a first direction through a first declination;

a second track, extending in a second direction, along which a second vehicle is arranged to travel, the second track arranged to pivot with respect to the first track between a first position in which the track is substantially horizontal and a second position in which the second track is declined in the second direction through a second declination;

a shaft coupled to the first and second vehicles, the shaft being arranged to rotate in dependence of the travel of the first and second vehicles along their respective tracks; wherein, the first vehicle is arranged to travel along the first track between a first drive location and a first idle location to drive the shaft in a first direction and to cause the second vehicle to travel along the second track between a second idle location and a second drive location; and, the second vehicle is arranged to travel along the second track from the second drive location to the second idle location to cause the drive shaft to rotate in a second direction and to cause the first vehicle to travel from the first idle location to the first drive location; wherein, the shaft is connected to a flywheel.

The addition of a flywheel to the shaft allows the production of power by the drive assembly across an increased range of environmental conditions. The flywheel may be used, along with the reproducible nature of the forces transmitted by the vehicles to the driveshaft, to reduce the instantaneous stresses acting on the generator, smoothing the variations in force experienced due to large waves, gusts of wind or surges in water flow, for example after a storm. This smoothing allows the drive assembly to be used to generate electricity where conventional systems would have to be disabled, turned off, or 'locked down', to prevent damage to the electrical generator due to the direct transmittance of forces to the driveshaft, and thus the generator, associated with these conventional systems.

Furthermore, the use of a flywheel allows electricity to be generated at times of low water flow, wind speed and wave action. Typically in renewable power generation, the gearing selected to rotate the drive shaft is a compromise solution for a wide range of environmental conditions. As such, no or very little power can be generated in times of relative calm. The use of the drive assembly with a flywheel allows a gearing to be chosen that allows vehicle movement along the tracks under any predicted environmental conditions and a consistent driving force applied to the drive shaft by the return of the vehicles to their original positions, this driving force again smoothed with the use of the flywheel.

Preferably, the drive assembly takes a form wherein the second track is arranged to pivot from the first position to the second position as the second vehicle travels along the second track.

It is also preferable for the first and, or second vehicles to be coupled to the drive shaft by a respective first and second belt, chain or tether. Such a tether may take the form of a rope, chainlink chain or belt that is preferably flexible but substantially inextensible.

It may also be preferable to replace or augment the first vehicle and first vehicle track with a counterweight. According to a second aspect of the invention, there is provided a drive assembly for providing a driving force, comprising:

a track along which a vehicle is arranged to travel, the track arranged to pivot with respect to the drive assembly between a first position in which the track is substantially horizontal and a second position in which the track is declined;

a counterweight;

a shaft coupled to the vehicle and the counterweight, the shaft being arranged to rotate in dependence of the travel of the vehicle and the counterweight; wherein, the vehicle is arranged to travel along the track between a drive location and an idle location to rotate the shaft in a first direction and to cause the counterweight to travel between a lower position and an upper position; and, the counterweight arranged to descend from the upper position to the lower position to cause the shaft to rotate in a second direction and to cause the vehicle to travel from the idle location to the drive location.

An embodiment of the drive assembly with a counterweight may reduce the size of the drive assembly, potentially increasing its portability. Again, preferably, the drive assembly takes a form wherein the track is arranged to pivot from the first position to the second position as the vehicle travels along the track.

It is also preferable for the vehicle and, or counterweight to be coupled to the drive shaft by a respective first and second belt, chain or tether.

According to a third aspect of the invention, there is provided a drive assembly for providing a driving force, comprising:

a first plurality of tracks along which a plurality of vehicles is arranged to travel, the first plurality of tracks being declined in a first direction through a first declination;

a second plurality of tracks, extending in a second direction, along which a second plurality of vehicles are arranged to travel, the second plurality of tracks arranged to pivot with respect to the first plurality of tracks between a first position in which the plurality of tracks are substantially horizontal and a second position in which the second plurality of tracks are declined in the second direction through a second declination;

a shaft coupled to the first and second plurality of vehicles, the shaft being arranged to rotate in dependence of the travel of the first and second plurality of vehicles along their respective tracks; wherein, the first plurality of vehicles are arranged to travel along the first plurality of tracks between a first plurality of drive locations and a first plurality of idle locations to rotate the shaft in a first direction and to cause the second plurality of vehicles to travel along the second plurality of tracks between a second plurality of idle locations and a second plurality of drive locations; and, the second plurality of vehicles are arranged to travel along the second plurality of tracks from the second plurality of drive locations to the second plurality of idle locations to cause the shaft to rotate in a second direction and to cause the first plurality of vehicles to travel from the first plurality of idle locations to the first plurality of drive locations; wherein the second plurality of tracks move between the first and second positions in phase with one another.

The use of a plurality of tracks and vehicles may allow the drive assembly to be reduced in size, as the length of an individual track may be reduced without compromising the overall generation capacity of the drive assembly, increasing its portability.

It may also be preferable for the plurality of tracks and vehicles to move out of phase with one another. The use of a plurality of tracks, operating out of phase with each other, may reduce the variation in force experienced by the drive shaft, as the vehicles return to their idle positions at separate times. This more consistent force experienced by the drive shaft may result in a concomitant increase in the consistency of the amount of electricity produced.

Preferably, the drive assembly takes a form wherein the second plurality of tracks is arranged to pivot from the first position to the second position as the second plurality of vehicles travel along the second track.

It is also preferable for the first and, or second plurality of vehicles to be coupled to the drive shaft by a respective first and second plurality of belts, chains or tethers. Such a tether may take the form of a rope, chainlink chain or belt that is preferably flexible but substantially inextensible.

According to a fourth aspect of the invention, there is provided a drive assembly for providing a driving force, comprising:

a first track along which a vehicle is arranged to travel, the first track being declined in a first direction through a first declination;

a second track, extending in a second direction, along which a second vehicle is arranged to travel, the second track arranged to pivot with respect to the first track between a first position in which the track is substantially horizontal and a second position in which the second track is declined in the second direction through a second declination;

a shaft coupled to the first and second vehicles, the shaft being arranged to rotate in dependence of the travel of the first and second vehicles along their respective tracks; wherein, the first vehicle is arranged to travel along the first track between a first drive location and a first idle location to rotate the shaft in a first direction and to cause the second vehicle to travel along the second track between a second idle location and a second drive location; and, the second vehicle is arranged to travel along the second track from the second drive location to the second idle location to cause the shaft to rotate in a second direction and to cause the first vehicle to travel from the first idle location to the first drive location; wherein, any vehicle track contains a means of slowing a vehicle at its distal end.

Slowing the vehicles as they approach the track's distal end, for example with, but not limited to, foams or rubber stoppers reduces the magnitude of any impact, or impacts, between the vehicle and the rest of the drive assembly. Preferably, the reduction in magnitude of these impacts will reduce the damaging stress on the components of the drive assembly, increasing their durability and extending the lifespan of the drive assembly.

Preferably, a track or plurality of tracks will have a distal portion that is arcuate. An arcuate distal portion of the track provides an integrated means for slowing a vehicle as it approaches the distal end of the track.

It may be preferable for the arcuate portion to form a minima where the vehicle rests in the second position. Such an arcuate track may prevent any collision between the vehicle and the rest of the drive assembly, removing any impact stresses, potentially increasing the durability and working life of the drive assembly.

It may also be preferable for the drive assembly to include an assistance member. The use of an assistance member may reduce the combined moment of a vehicle track and vehicle as it is being lifted by the drive assembly, allowing the vehicle to be moved from an idle position to a drive position more easily during the operation of the drive assembly.

The drive assembly may also include a means of moving a track or a plurality of tracks from the second position to the first position. This movement of the tracks from the second position to the first position may be powered by wave action, water flow, animal power, wind power, mechanical means or any of the above means in any combination. The potential to use various different methods of renewable electricity generation, separately or in combination, with the same drive assembly expands the conditions under which electricity may be generated.

BRIEF DESCRIPTION OF THE DRAWINGS

The invention will now be described by way of example with reference to the following figures in which.

DETAILED DESCRIPTION

Figure 1:
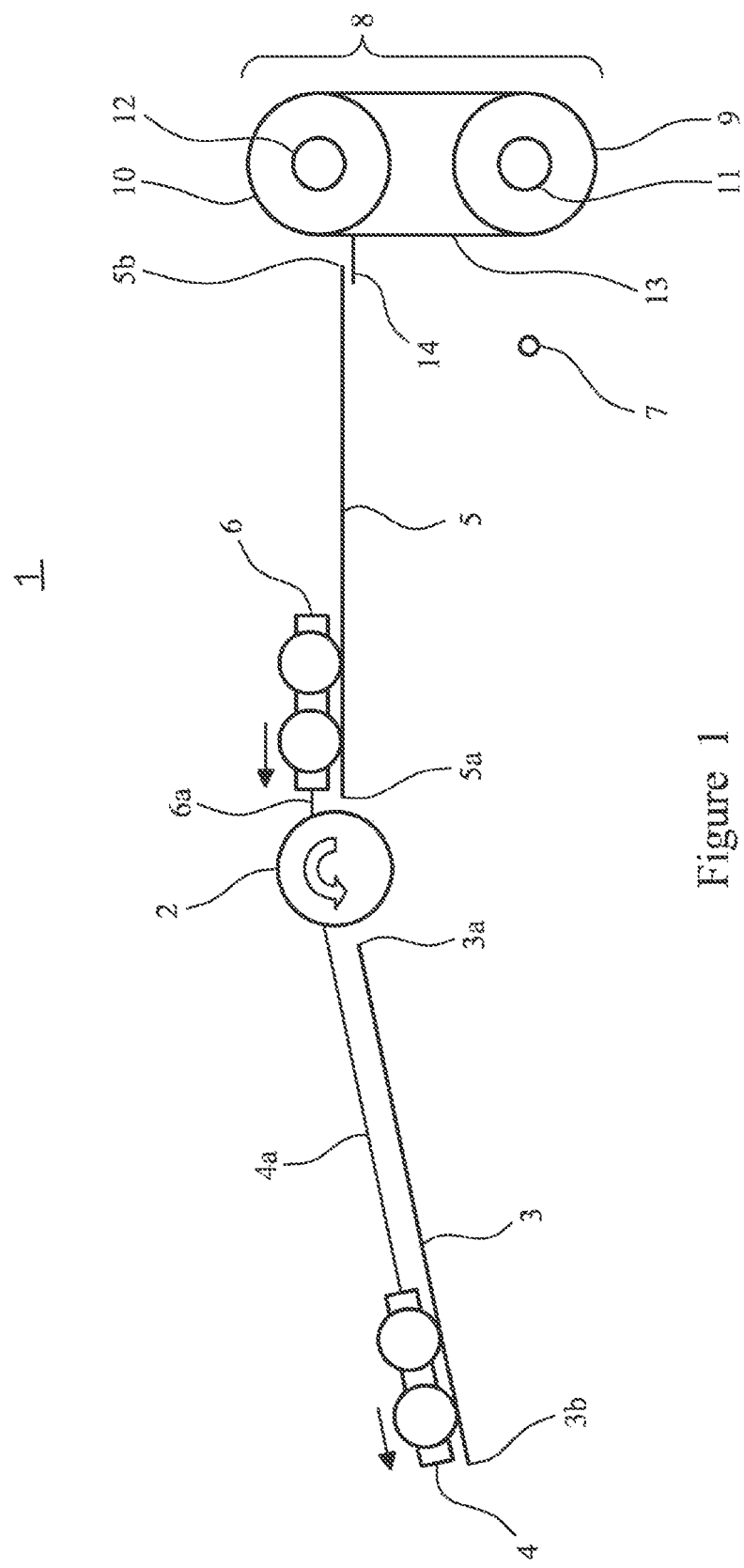
FIG. 1 is a schematic illustration of a side view of a drive assembly according to an embodiment of the present invention, with the second vehicle track arranged in the first position.

Referring to FIG. 1 there is a drive assembly 1 for generating a driving force, associated with a drive shaft 2, attached to an electrical generator (not shown) via a flywheel (not shown). The drive assembly 1 compromises a first linear track 3 which is arranged to support a first vehicle 4, and a second linear track 5 which is arranged to support a second vehicle 6. In this embodiment of the invention, a vehicle may take the form of a wheeled weight. Each track is constructed out of resilient materials, preferably metal, wood or plastic or a combination of these materials, though it will be appreciated the use of other materials is possible. The second linear track 5 is arranged to extend in substantially the same plane as the first linear track 3, substantially perpendicular to the drive shaft 2, and both tracks allow their respective vehicles to pass freely along the track.

The first and second tracks 3, 5 compromise a proximal end 3a, 5a and a distal end 3b, 5b. The proximal end 3a, 5a of each track 3, 5 is disposed adjacent to the drive shaft 2, such that the first and second tracks 3, 5 extend from opposite sides of the drive shaft 2. The drive shaft 2 is coupled to the first and second vehicles 4, 6 via a respective belt, chain, rope or tether 4a, 6a or similar and is arranged to rotate about an axis which extends substantially perpendicular to the first and second tracks, 3, 5 in dependence with the movement of the first and second vehicles 4, 6 along the respective tracks 3, 5.

The first track 3 is orientated in a substantially fixed orientation in which the track 3 is declined such that the distal end 3b of the first track is arranged in a lower vertical position than the proximal end of the track 3a. The second track 5 is arranged to pivot around its proximal end 5a, between a first position in which it is substantially horizontal, or, preferably but not essentially, with its distal end 5b arranged in a higher vertical position than its proximal end 5a and a second position in which the distal end of the track 5b is arranged in a lower vertical position than its proximal end 5a. Preferably, but not essentially, the second track may rest on a track stop 7 when it is located in the second position, the track stop 7, preferably but not essentially, located at the distal end of the second track 5b.

The second track 5 is biased to the second position, preferably by gravity, and is driven to the first position by a driving cogset 8. The driving cogset comprises upper and lower sprockets 9, 10 mounted on upper and lower driveshafts 11, 12, a belt or chain 13 and a track lifter 14. Sprockets 9, 10 are arranged to separately rotate about an axis that extends through the centre of the respective sprocket 9, 10, and the axis of rotation of each sprocket 9, 10 is arranged to be substantially parallel to each other, and substantially parallel to the axis of the respective drive shafts 11, 12.

The driving cogset 8 is preferably powered by renewable means such as water flow, wave power, wind power or animal power although it will be appreciated that mechanical equipment such as a motor could also be used to power it. These powering means will drive one, or both of the drive shafts 11, 12, causing the belt or chain 13 to move around the sprockets 9, 10, in turn moving the track lifter 14 around the circumference of the driving cogset 8.

The driving cogset 8 acts on the second track to move it from the second position to the first position. Preferably, the track lifter 14 engages with the distal end of the second track 5b and lifts it against the force of gravity to the first position. The track lifter 14 may compromise a hook, bar, catch or interlock with the distal end of the second track 5b to lift it to the first position, although other possibilities such as contact between high friction surfaces on the track lifter 14 and the distal end of the second track 5b are not excluded.

When the second track 5 reaches the first position, the track lifter 14 disengages from the distal end of the second track 5b. As such, the second track 5 falls under its own weight and the influence of gravity to the second position where it is arrested by the track stop 7. Track stop 7 includes a damper mechanism (not shown) to reduce the impact of the second track 5 striking the stop. When two track lifters, 14, are fixed to the chain, a rapid fall of the track is required before the track is picked up again. Advantageously this ensures that a high speed turn of the chain will lift the track.

The tethers 4a, 6a which couple the first and second vehicles 4, 6 to the drive shaft 2 are connected at one end to the respective vehicle 4, 6 and at the other end to a respective first and second wheel (not shown). The first tether 4a, attached to the first vehicle 4, is arranged to coil and uncoil from around the first wheel (not shown) which is coupled to the drive shaft 2. The second tether 6a, attached to the second vehicle 6, is arranged to coil and uncoil from around the second wheel which is also coupled to the drive shaft 12. In use, when the second track 5 is in the second position, the first tether 4a is initially coiled upon the first wheel (not shown) and the first vehicle 4 is arranged proximate to the drive shaft 2, whereas the second tether 6a is substantially uncoiled from the second wheel (not shown) and the second vehicle 6 is disposed proximate to the distal end of the second track 5b.

A driving force is generated by the drive assembly 1 when the drive shaft 2 is rotated. In order to generate this driving force as the second track 5 is lifted by the track lifter 14 the first vehicle 4 is released from its position proximate to the drive shaft and moves down the first track 3. As the first vehicle 4 travels along the first track 3 the first tether 4a becomes unwound from the first wheel (not shown) causing the first wheel to rotate and thus driving the drive shaft 2. Concurrently, the rotating drive shaft 2 causes the second wheel (not shown) to rotate, causing the second tether 6a to coil upon the second wheel (not shown).

As the second track 5 approaches the first location, the second vehicle 6 becomes proximate to the drive shaft 2 and the second tether 6a becomes substantially coiled around the second wheel (not shown). As the second track approaches the first location, the first vehicle 4 approaches the distal end of the first track 3b and the first tether 4a becomes substantially uncoiled.

When the second track 5 arrives at the first location it is released, or becomes unsupported, by the track lifter 14. The second track 5 then falls under the influence of gravity to a position where the distal end of the second track 5b is in a lower vertical position than the proximal end of the second track 5a. Preferably, but not essentially, the second track is supported in this position by a track stop 7.

With the second track 5 in the second position, the second vehicle 6 is released and moves towards the distal end of the second track 5b, causing the second tether 6a to uncoil from around the second wheel (not shown) and rotate the drive shaft 2 in the opposite direction to the proceeding lifting process. Concurrently, the rotation of the drive shaft 2 results in the first tether 4a coiling around the first wheel (not shown) and the first vehicle moving towards the proximal end of the first track 3a. The movement of the first and second vehicles 4, 6 along their respective tracks 3, 5 continues until the second vehicle is located at the distal end of the second track 5b and the second tether 6a is substantially uncoiled and the first vehicle is located at the proximal end of the first track 3a and the first tether 4a is substantially coiled. The second track 5 may then again be lifted by the track lifter 14, continuing the process of rotating the drive shaft 2 and the generation of electricity.

Figure 2:
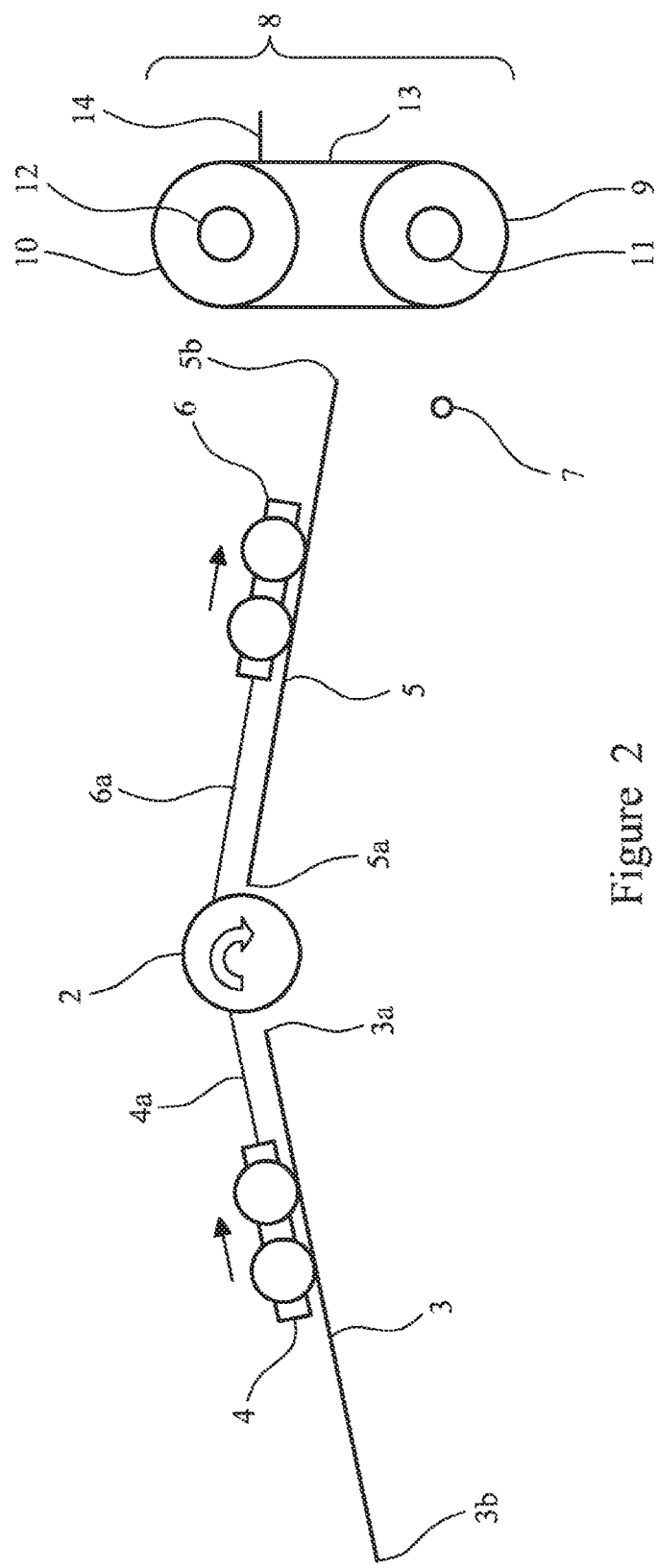
FIG. 2 is a schematic illustration of a side view of a drive assembly according to an embodiment of the present invention, with the second vehicle track arranged between the first and second positions.
Figure 3:
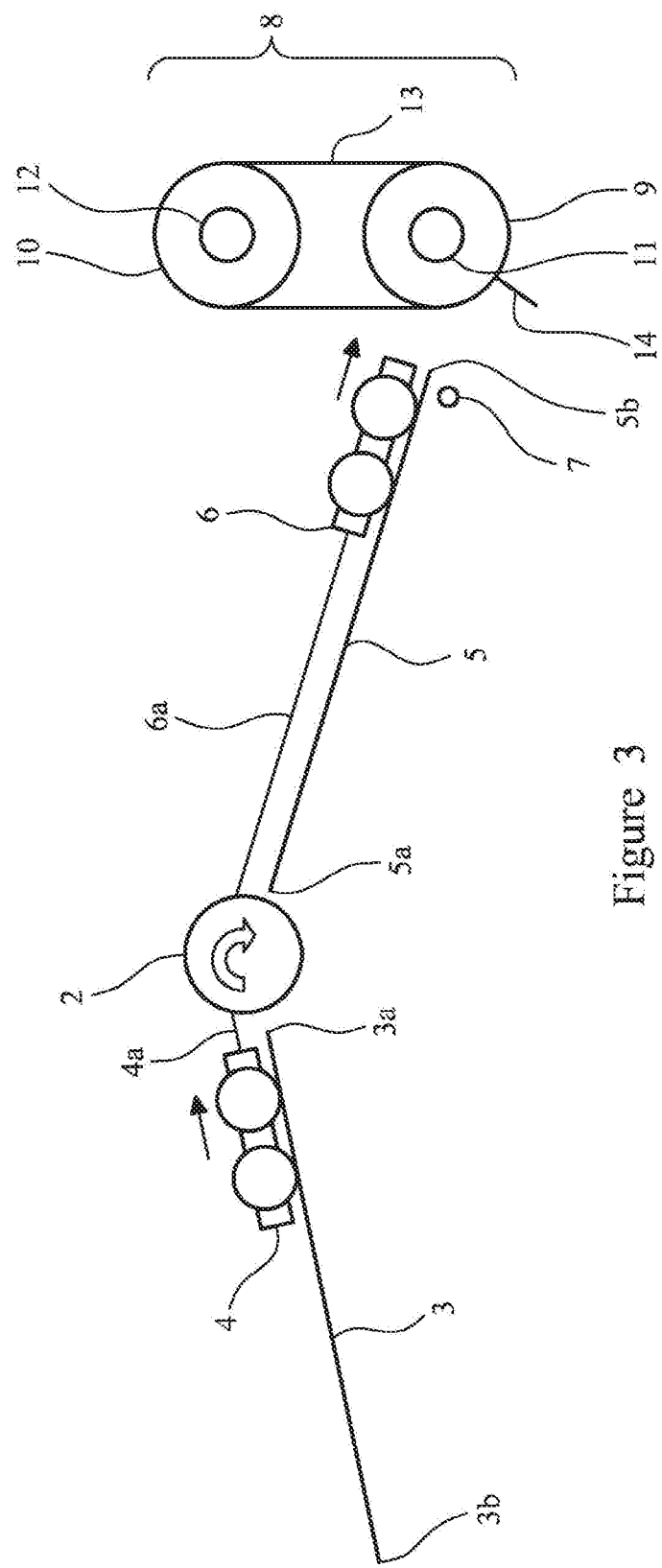
FIG. 3 is a schematic illustration of a side view of a drive assembly according to an embodiment of the present invention, with the second vehicle track arranged in the second position.

The process of lifting the second track 5 and the movement of the first and second vehicles 4, 6 is schematically depicted in FIGS. 1-3. FIG. 2 shows the second track 5 intermediate between the first and second position, with FIG. 3 showing the second track 5 in the second position, resting on the track stop 7.

Figure 4:
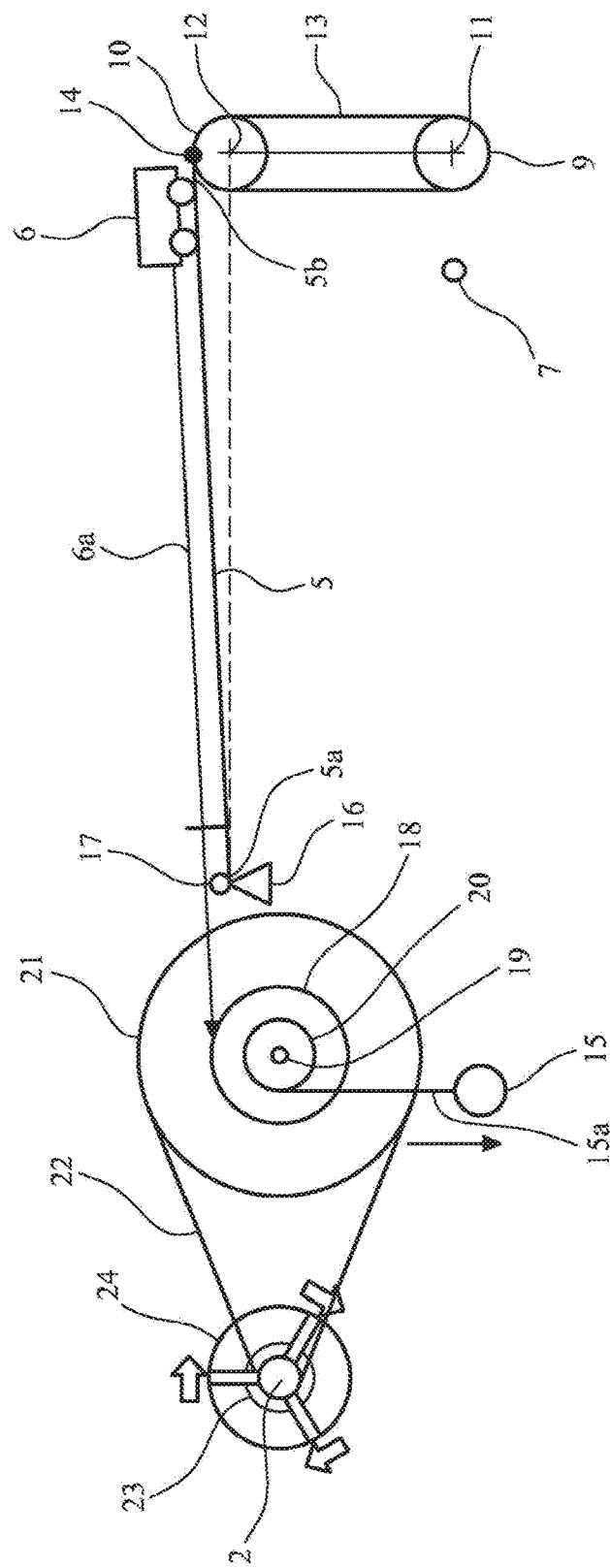
FIG. 4 is a schematic illustration of a side view of a drive assembly according to an embodiment of the present invention, with the second vehicle track arranged in the first position, and the first vehicle track replaced with a counterweight.
Figure 5:
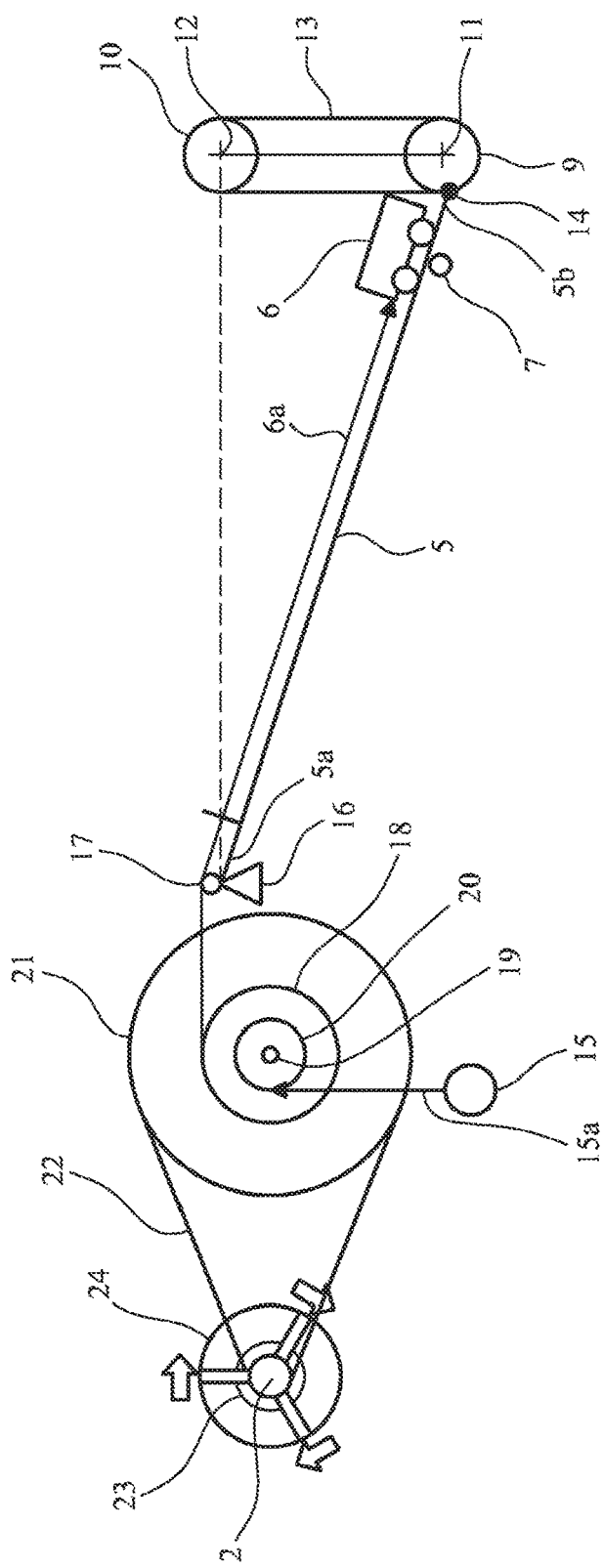
FIG. 5 is a schematic illustration of a side view of a drive assembly according to an embodiment of the present invention, with the second vehicle track arranged in the second position, and the first vehicle track replaced with a counterweight.

FIGS. 4 and 5 schematically illustrates an aspect of the present invention where the first track has been replaced with a counterweight 15. Replacement of the first track with a plurality of counterweights is also envisaged. Here the second track pivots in an axis substantially perpendicular to the drive shaft 2 around a pivot point 16. In this embodiment, the second tether may pass over a pulley 17 before it is attached to a second wheel 18. The second tether 6a is arranged to coil and uncoil around the second wheel 18 which is coupled to the sprocket shaft 19. The counterweight 15 is attached to a counterweight tether 15a which is arranged to coil and uncoil around a counterweight wheel 20 which is also coupled to the sprocket shaft 19. A sprocket 21, is coupled to the sprocket shaft 19 which is connected to a driveshaft 2 by a drive chain or belt 22 and a drive sprocket (not shown), preferably mounted on a freewheel. An electrical generator 23 and a flywheel 24 may be mounted on the drive shaft 2.

As the second track 5 is raised from the second to the first position by the track lifter 14, the counterweight 15 moves down, causing the sprocket shaft 19 to rotate and the counterweight tether 15a to uncoil from around the counterweight wheel 20. Concurrently, the second vehicle 6 is moved towards the proximal end of the second track 5 as the second tether 6a coils around the second wheel 18 due to the rotation of the sprocket shaft 19. The rotation of the sprocket shaft 19 in turn causes the rotation of the sprocket 21, transmitted to the drive sprocket (not shown) mounted on the drive shaft 2 by the drive chain 22. This rotation is preferably not transmitted to the drive shaft as the drive sprocket (not shown) is mounted on a freewheel, allowing the continued generation of electricity from any remaining rotation of the drive shaft 2 and flywheel 24 from a previous drive phase. As the second vehicle 6 reaches the proximal end of the second track 5 the second tether 6a is substantially coiled around the second wheel 18 and the counterweight tether 15a is substantially uncoiled from around the counterweight wheel 20.

In use the sprocket shaft 19 is turned only in one direction. Advantageously the sprocket shaft does not need to be continually turned, but only turns when each vehicle 4, 6 descends a track 3, 5. This ensures that there is low stress on the driven generator and its drive shaft 2 and sprocket 21. The flywheel and/or weighted generator hub ensures that the electrical generator 23 keeps rotating when the sprocket shaft 19 stops rotating. Wheels 18 and 20 are fixed to a freewheel (ratchet) that drives the sprocket shaft 19 in one direction only. The counterweight 15 only needs to be heavy enough to wind the tether 6a back onto wheel 20. The curved rods and lifting track 5 ensure that the vehicle 4, 6 is returned to its drive position. As the vehicle 4,6 descends down its track 5, the tether 6a pulls on the wheel 18 that rotates the drive shaft 2 (rotating sprocket 21 and the connected generator 23) and simultaneously winds the counterweight tether 15a back onto the wheel 20 as the counterweight 15 is lifted.

On reaching the first position the second track 5 becomes unsupported or decoupled from the track lifter 14 and moves towards the second position under the influence of gravity. As the second track 5 moves towards the second position, the second vehicle 6 moves towards the distal end of the second track 5b and the second tether 6a uncoils from around the second wheel 18, rotating the second wheel 18 and the sprocket shaft 19 in the opposite direction to the direction of rotation in the track lifting phase. Concurrently, the counterweight tether 15a coils around the counterweight wheel 20 as it is rotated by the sprocket shaft 19. The rotation of the sprocket shaft 19 in turn causes the sprocket 21 to rotate, driving the drive shaft 2 via the drive chain 22 and drive sprocket (not shown). The rotation of the drive shaft 2 causes the rotation of the flywheel 24, a rotation that extends beyond the initial drive period itself due to the mass of the flywheel, allowing a more efficient generation of electricity by the generator 23.

Figure 6:
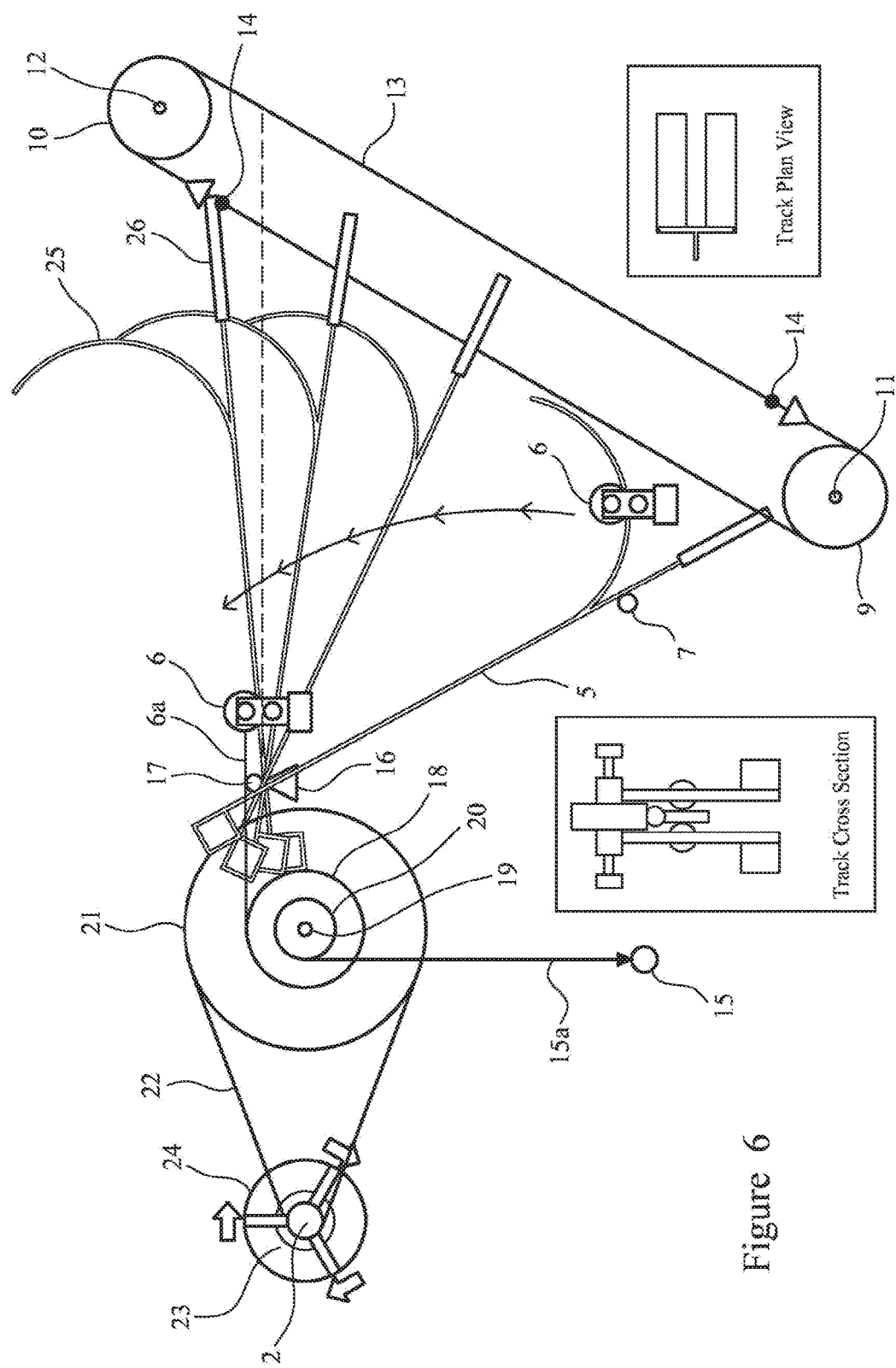
FIG. 6 is a schematic illustration of a side view of a drive assembly according to an embodiment of the present invention, illustrating the movement of the second vehicle track from the first to the second position and the first vehicle track replaced with a counterweight.

FIG. 6 schematically illustrates an embodiment of the invention where the distal ends of the second track 5 are arcuate. In this embodiment, the distal end of the second track 5 splits into two different members, though such splitting is not essential. The two members may include a curved track member 25 and a lifting member 26. It is preferable that the second vehicle 6 progresses onto the curved track member 25 as it approaches the distal end of the second track 5, gradually reducing its velocity, whilst the track lifter 14 engages with the lifting member 26, moving the second track from the first to the second position.

The use of a curved track member 25 reduces the vertical distance travelled by the second vehicle 6, causing a concomitant reduction in the drive that may be supplied to the drive shaft 2 and thus the electricity generated by the electrical generator 23. Therefore, it is preferable, but not essential, for a plurality of drive assemblies 1 to operate in communication with a single drive shaft 2 to increase the potential for electrical generation. Such a plurality of drive assemblies 1 may work with the lifting of their respective second tracks 5 being in or out of phase with one another, depending on the preference of the user and the overall generation requirements.

Figure 7:
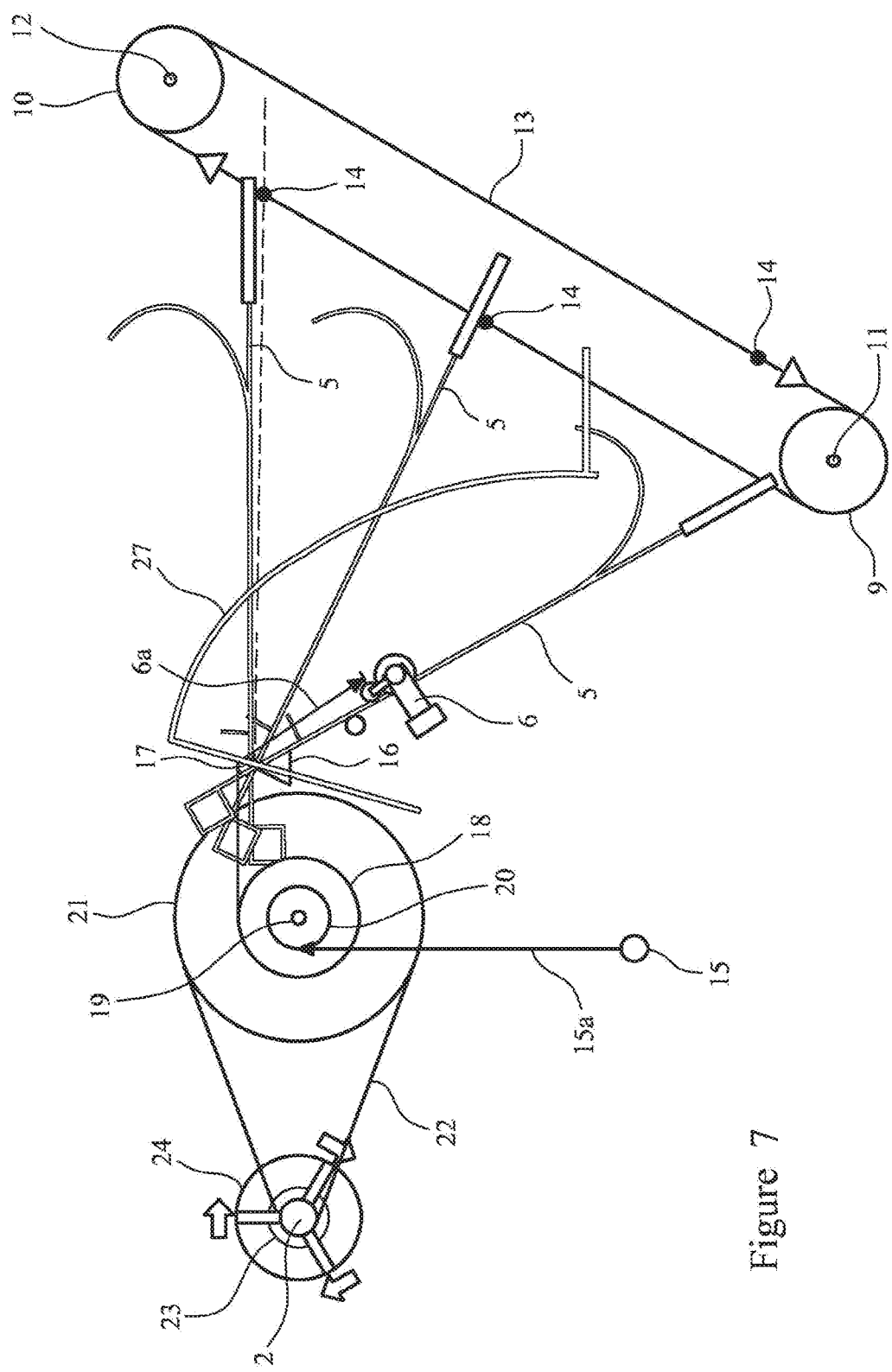
FIG. 7 is a schematic illustration of a side view of a drive assembly according to an embodiment of the present invention, illustrating the movement of the second vehicle track from the first to the second position via the use of an assistance member.

FIG. 7 schematically illustrates an embodiment of the invention where the movement of the second vehicle 6 from the distal 5*b* to the proximal 5*a* end of the second vehicle track 5 is assisted by the assistance member 27. In this embodiment, the assistance member is a curved rod although other possible embodiments are not excluded. The use of the assistance member 27 causes the movement of the second vehicle 6 from the distal 5*b* to the proximal 5*a* end of the second vehicle track 5 to begin at an earlier point during the lifting of the second vehicle track 5 by the track lifter 14. This earlier movement of the second vehicle 6 from the distal end 5*b* of the second vehicle track 5 results in a concomitant earlier decrease in the mass at the distal end 5*b* of the track. As such, the moment which must be overcome to lift the second vehicle track 5 and the second vehicle 6 is reduced, and the drive assembly 1 may be operated more easily.

It is also envisaged that only one track lifter is affixed to the chain. In this instance a slower fall of the track can be encouraged by using a counterweight on the other end of the track beyond pivot point 16 or other slowing means. The vehicle is held by a sprung latch or similar device towards the track pivot at the drive position and the vehicle is released when the track lowers to a maximum extent. This could suit a larger scale more powerful device with further numbers of tracks making up for the reduction in the times each track drops (there are fewer track lifters) and having the tracks fall to say a 45 degree angle using heavier vehicles with a shorter chain 13 required with an easily counterweighted track (at a shallower angle).

It is further envisaged that vehicle 4, 6 could utilise more bearings or wheels for stability. The tracks 3, 5 could also have different cross-sectional shapes.

Referring to FIG. 7, advantageously, the vehicle 6 is encouraged to return to the drive location by the assistance member 27, allowing for a shorter track 5 with faster cycles. Lifting member 26 can disengage from the track lifter 14 without causing stress to the assembly as the weighted vehicle 6 is ready at its drive position near to the pivot 16 of the track 5 and the track acts like a lever. The curved rod mechanism 27 allows the vehicle 6 to arrive at its drive position without causing impact on the assembly.

The drive shaft 2 and its associated sprockets and generator 23 may be independently mounted within a frame between springs and suspension legs (similar to a washing machine drum and its motor). Such an embodiment may prevent damage to the generator 23 from forces upon the frame.

The assistance members are most compatible with a land based apparatus that is free to travel (e.g. on roads or rails) to allow for changes in level. A portable or mobile variant can be especially suited to land-based applications and can be arranged to travel up and down hills. I think this is non-obvious as the original version was designed to be fixed in a permanent position (at a fixed angle) plus I have a few other points that I can make. It could not float nor move on land.

The curved rods also allow for higher variable speeds of input power, inherent to the land based version, as the vehicles are sent to the pivot point more quickly during the lift (the vehicle travel time between one end of the arm or track to the other is reduced), therefore using fewer arms or tracks and where the arm will always fall with the vehicle near to or at the pivot. The assistance members are also compatible with use on rivers with erratic high speed flows (power from flows in steep terrain) or on large estuaries where a floating version using a water wheel could be affected by wave motion fore and aft when at anchor or attached to a mooring buoy. Some water based scenarios are not for use in a static or fixed design. Also, in a land based application, such as for electric land-vehicle use the multiple arms and curved rods can charge a reserve battery. The principle of operation of the embodiment is maintained but the apparatus is very different to the wave/water flow approach on a fixed rig.

Figure 8:
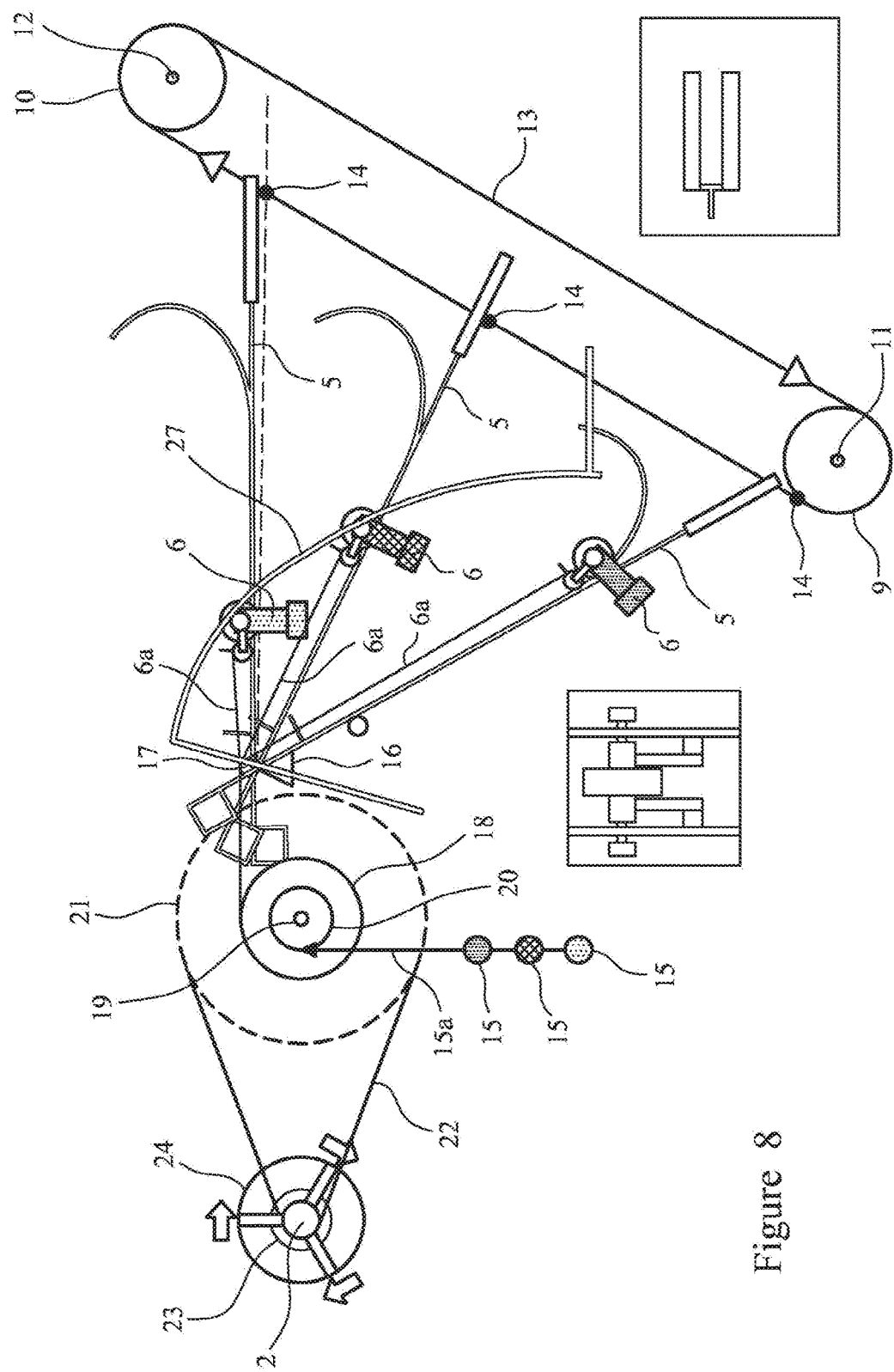
FIG. 8 is a schematic illustration of a side view of a drive assembly according to an embodiment of the present invention, illustrating the movement of vehicles with a plurality of tracks, here 3.

Advantageously more vehicles 6 can be lifted on a plurality of tracks 5. Such an embodiment may also use the curved rods 27 such that less total weight is being lifted by each track 5 at its distal end. Referring to FIG. 8 the track 5 shown half way up its lift has the vehicle 6 half way along its track, halving the vehicle weight to be lifted (as the track 5 acts as a lever).

The freewheels (one-way ratchets) allow for a multiple track system so that each set of wheels 18 and 20 can operate independently to each other set fixed to the shared sprocket shaft 19. Therefore whilst one vehicle 6 is descending its track 5 and rotating wheel 18 in a drive direction another vehicle 6 can be ascending its track 5 with counterweight 15 rotating wheel 20 in the reverse reset direction. The multiple track and units result in the system benefits of smoothing power transition, simplification of the components required and the apparatus can be scalable, although only 3 tracks are illustrated in FIG. 8, many more tracks are possible.

The availability of multiple units allows the system in FIG. 8 to adjust to changes in input power and the corresponding change in the speed of the vehicles. This changing input power can be due to any one of, for example, changing wave heights, changing wind speed, changing river flow speed, changing electric vehicle speed.

As well as the freewheels shown in FIG. 8, the multiple tracks enable a simple gearing system to be included in the drive assembly. Each individual pulley wheel can be differently sized. In the example of a water wheel, when the river is flowing very fast, the extra power can be utilised by lowering extra arms with heavier vehicles onto the chain drive. These vehicles are at rest at the pivot end and once the arms are arranged to release, the vehicles can rotate the communal drive shaft. The arms with lighter vehicles can be arranged to be dis-engaged, by being held at the distal end above the pivot point height of the arm. This gearing is incorporated to greatly increase the rpm of the generator. The multiple tracks also work with a set of differently sized communal sprockets or pulley wheels (if belt driven) that engage and dis-engage from the communal drive shaft (when it is not rotating between each drive action of each arm and vehicle), depending upon the speed of flow of the river. The same vehicles can do more work when turning a larger diameter communal sprocket or pulley wheel. Once the flywheel and/or a weighted generator picks up speed, it becomes easier to rotate faster by using a larger diameter communal sprocket or pulley wheel. This type of high speed, low resistance generator (for example a permanent magnet generator) can accelerate and de-accelerate between each drive action. A constant rotation of the generator can be maintained without any associated damage by an over-acceleration of the generator. The multiple track embodiment is a way of operating a long-term generator using erratic changing input speeds of power. This gearing is incorporated to greatly increase the rpm of the generator. In FIG. 8 the main communal drive sprocket or pulley wheel does not drive (rotate) constantly, but is designed to rotate only during a drive action of each arm and vehicle. This ensures that the system can survive changing surges of input power and minimises the wear and stresses of the moving parts.

In addition, as shown in FIG. 8, each track or arm can have a counterweight 15 fixed on the other side of the pivot, to reduce the amount of effort required to lift the track and vehicle. The vertically movable counterweight 15 is designed to take up the slack of the tether and encourage the vehicle to run towards the pivot point once the arm has been lifted above the horizontal position. The mass of the vehicle and sloping arm allow the vehicle to move to the pivot point, the counterweight and tether add a small assistance to this movement. The freewheel attached to each pulley wheel is operated by the counterweight that allows the freewheel to naturally engage and dis-engage with the communal drive shaft. The counterweight 15 does not have to assist in the vehicle being pulled towards the pivot point whilst the arm (track) is being lifted up from a declined position towards the horizontal position.

Various modifications may be made to the described embodiment without departing from the scope of the present invention. The structure and orientation of the apparatus may be of an alternative design and shaping, there may be one or more vehicles and one or more tracks. The apparatus may comprise any suitable material and may be of any length and thickness. Alternative forms of construction may be considered. The apparatus may be fixed for example with a fixed rig for wave or water applications, or moveable such as with a land based apparatus or portable. A straight shaft embodiment with vertical tracks is possible and could work most effectively when used with a set of multiple tracks built parallel to/alongside each other on a shared drive shaft using lightweight vehicles. In this embodiment there would be a sprung stopper at the base of each of the vertical tracks to minimise the impact of each descending vehicle and the vehicles would be arranged to descend at a slow rate.

The system is of use with any renewable energy source so that the apparatus allows the renewable generation of electricity. Examples include land based, electrical vehicles used for land use, wave power options, wind power/turbines with vertical access or angled drives available from the turbine.

In particular, in a water based example, a vertical track could be envisaged, or a fixed angle track, and here floats could be driven within and through the water so that there is no requirement for the tracks to change angle over time, the tracks remain at a fixed angle relative to the moving vertical counterweight. In one embodiment the apparatus would be included on a sea wall or in a wave tank. The tracks are arranged to be held in place by a horizontal bar that is bolted (or unbolted) to the frame and the four sets of pulley wheels for floats can be bolted to the frame when a water wheel is removed. Each float (pulley wheel) can be adapted to rise and fall on a wave with twice the movement of the vehicle attached with, for example, a maximum wave height (crest to trough) of 0.5 meters. In this example, as a weighted float rises on a wave, the vehicle enables the slack cable between the communal drive shaft and the float to be taught. The vehicle runs down the track slope with enough mass to keep a cable taught at any wave frequency. As a weighted float descends on a wave, the float pulls the vehicle up the slope and simultaneously winds the counterweight up, rotating the communal drive shaft and the associated generator. Many floats can be attached to one large communal drive shaft, allowing low wave heights to accumulate rotations on the drive shaft to generate electricity with resulting low speed rotations or high wave heights to also generate electricity without over speeding the generator. The varying power of waves will not cause operational stress on the generator and associated drive assemblies.

The invention claimed is:

1. A drive assembly comprising:
a vehicle and a track along which the vehicle is arranged to travel, the track arranged to pivot between a first position in which the track is substantially horizontal and a second position in which the track is declined;
a counterweight;
a shaft coupled to the vehicle and to the counterweight, the shaft arranged to rotate in dependence of the travel of the vehicle and the counterweight; wherein,
the vehicle is arranged to travel along the track between a drive location and an idle location to rotate the shaft in a first direction and to cause the counterweight to travel between a lower position and an upper position; and,
the counterweight is arranged to descend from the upper position to the lower position as the track is moved from the second position to the first position; and
wherein the drive assembly includes an assistance member arranged to apply a force to the track and/or the vehicle such that an assisted combined moment of the track and the vehicle is reduced compared to an unassisted combined moment of the track and the vehicle without the force.

2. The drive assembly of claim 1, wherein descent of the counterweight from the upper position to the lower position rotates the shaft in a second direction and causes the vehicle to travel from the idle location to the drive location.

3. The drive assembly of claim 1, wherein the track is arranged to pivot from the first position to the second position as the vehicle travels along the track.

4. The drive assembly of claim 1, wherein at least one of the vehicle and the counterweight is coupled to the shaft by a belt, chain or tether.

5. The drive assembly of claim 1, further comprising means of moving the track from the second position to the first position.

6. The drive assembly of claim 5, wherein movement of the track from the second position to the first position is powered by wave action, water flow, animal power, wind power, mechanical means or combinations thereof.

7. The drive assembly of claim 1, further comprising a track lifter, wherein the drive assembly comprises a pivot point about which pivoting of the track occurs, the pivot point having a first side and a second side opposing the first side, the vehicle being arranged to travel along a portion of the track positioned on the first side of the pivot point and wherein the drive assembly further comprises slowing means coupled to the track at a portion of the track positioned on the second side of the pivot point.

8. A drive assembly comprising:
a first plurality of tracks along which a plurality of first vehicles is arranged to travel, the first plurality of tracks being declined in a first direction through a first declination;
a second plurality of tracks, extending in a second direction, along which a second plurality of vehicles is arranged to travel, the second plurality of tracks arranged to pivot with respect to the first plurality of tracks between a first position in which the second plurality of tracks is substantially horizontal and a second position in which the second plurality of tracks is declined in the second direction through a second declination;
a shaft coupled to the first and second plurality of vehicles, the shaft being arranged to rotate in dependence of travel of the first and second plurality of vehicles along the respective first and second plurality of tracks; wherein,
the first plurality of vehicles is arranged to travel along the first plurality of tracks between a first plurality of drive locations and a first plurality of idle locations to rotate the shaft in a first direction and to cause the second plurality of vehicles to travel along the second plurality of tracks between a second plurality of idle locations and a second plurality of drive locations;
the second plurality of vehicles is arranged to travel along the second plurality of tracks from the second plurality of drive locations to the second plurality of idle locations to cause the shaft to rotate in a second direction and to cause the first plurality of vehicles to travel from the first plurality of idle locations to the first plurality of drive locations; wherein
the second plurality of tracks move between the first and second positions in phase with one another.

9. The drive assembly of claim 8, wherein the second plurality of tracks and second plurality of vehicles move between the first and second positions at variable or different time intervals, out of phase with one another.

10. The drive assembly of claim 8, wherein the second plurality of tracks is arranged to pivot from the first position to the second position as the second plurality of vehicles travels along the second plurality of tracks.

11. The drive assembly of claim 8, wherein the second plurality of vehicles is coupled to the shaft by a belt, chain or tether.

12. The drive assembly of claim 8, further comprising a track lifter, wherein the drive assembly comprises a pivot point about which pivoting of the second plurality of tracks occurs, the pivot point having a first side and a second side opposing the first side, the second plurality of vehicles being arranged to travel along a portion of the second plurality of tracks positioned on the first side of the pivot point and wherein the drive assembly further comprises slowing means coupled to the second plurality of tracks at a portion of the second plurality of tracks positioned on the second side of the pivot point.

13. The drive assembly of claim 8, further comprising means of moving the second plurality of tracks from the second position to the first position.

14. The drive assembly of claim 13, wherein movement of the second plurality of tracks from the second position to the first position is powered by wave action, water flow, animal power, wind power, mechanical means or combinations thereof.

15. A drive assembly comprising:
a first track along which a first vehicle is arranged to travel, the first track being declined in a first direction through a first declination;
a second track, extending in a second direction, along which a second vehicle is arranged to travel, the second track arranged to pivot with respect to the first track between a first position in which the second track is substantially horizontal and a second position in which the second track is declined in the second direction through a second declination;
a shaft coupled to the first and second vehicles, the shaft being arranged to rotate in dependence of the travel of the first and second vehicles along the respective first and second tracks; wherein,
the first vehicle is arranged to travel along the first track between a first drive location and a first idle location to rotate the shaft in a first direction and to cause the second vehicle to travel along the second track between a second idle location and a second drive location; and,
the second vehicle is arranged to travel along the second track from the second drive location to the second idle location to cause the shaft to rotate in a second direction and to cause the first vehicle to travel from the first idle location to the first drive location; wherein,
at least one of the first and second tracks comprises an arcuate distal portion.

16. The drive assembly of claim 15, wherein the second track has the arcuate distal portion and wherein the arcuate distal portion forms a minima where the second vehicle rests when the second track is in the second position.

17. The drive assembly of claim 15, wherein the second track is arranged to pivot from the first position to the second position as the second vehicle travels along the second track.

18. The drive assembly of claim 15, wherein at least one of the first and second vehicles is coupled to the drive shaft by a belt, chain or tether.

19. The drive assembly of claim 15, further comprising a track lifter, wherein the drive assembly comprises a pivot point about which pivoting of the second track occurs, the pivot point having a first side and a second side opposing the first side, the second vehicle being arranged to travel along a portion of the second track positioned on the first side of the pivot point and wherein the drive assembly further comprises slowing means coupled to the second track at a portion of the second track positioned on the second side of the pivot point.

20. The drive assembly of claim 15, further comprising means of moving the second track from the second position to the first position.

21. The drive assembly of claim 20, wherein movement of the second track from the second position to the first position is powered by wave action, water flow, animal power, wind power, mechanical means or combinations thereof.

* * * * *